US011722873B2

(12) United States Patent
Liu et al.

(10) Patent No.: US 11,722,873 B2
(45) Date of Patent: Aug. 8, 2023

(54) BLUETOOTH MESH NETWORK SYSTEM AND CONNECTION METHOD HAVING COMMUNICATION RANGE EXTENDING MECHANISM

(71) Applicant: REALTEK SEMICONDUCTOR CORPORATION, Hsinchu (TW)

(72) Inventors: Yong Liu, Suzhou (CN); Yang Huang, Suzhou (CN); Bin Shao, Suzhou (CN); Shi-Meng Zou, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 39 days.

(21) Appl. No.: 17/555,904

(22) Filed: Dec. 20, 2021

(65) Prior Publication Data

US 2022/0286829 A1  Sep. 8, 2022

(30) Foreign Application Priority Data

Mar. 3, 2021  (CN) .......................... 202110234682.2

(51) Int. Cl.
*H04B 7/00* (2006.01)
*H04W 4/80* (2018.01)
(Continued)

(52) U.S. Cl.
CPC ............. *H04W 4/80* (2018.02); *H04W 76/10* (2018.02); *H04W 84/18* (2013.01)

(58) Field of Classification Search
CPC ........ H04W 4/80; H04W 76/10; H04W 84/18
(Continued)

(56) References Cited

U.S. PATENT DOCUMENTS

2019/0081834 A1* 3/2019 de Ruijter ........... H04L 27/0014
2020/0100307 A1* 3/2020 Sridhara ............... H04W 76/20
(Continued)

OTHER PUBLICATIONS

OA letter of the counterpart TW pplication (U.S. Appl. No. 11/019,774) dated Nov. 30, 2021 Summary of the OA letter: 1. Claims 1, 5 6 and 10 are rejected as allegedly being unpatentable in view of cited reference 1 (Temboo, "Everything You Need to Know About Bluetooth Mesh for Industrial IOT", Feb. 24, 2018) and cited reference 2 (Hadi Deknache; Mikael Nilsson, "Investigation of Bluetooth Mesh and Long Range for IoT wearables", Date of final seminar May 30, 2018, Malmo University.
(Continued)

*Primary Examiner* — April G Gonzales
(74) *Attorney, Agent, or Firm* — WPAT, P.C

(57) ABSTRACT

The present invention discloses a Bluetooth mesh network system having a communication range extending mechanism that includes a plurality of nodes and a provisional node. The provisional node is configured to transmit a connection setting packet to the nodes to control the nodes to establish a coded PHY connection between each two of the nodes such that a packet error rate is smaller than a threshold value when the nodes perform communication when a physical distance between each two of the nodes is larger than a maximum non-coded-PHY communication distance, in which when the nodes establish a non-coded-PHY connection and the physical distance is larger than the maximum non-coded-PHY communication distance, the packet error rate is larger than the threshold value.

12 Claims, 2 Drawing Sheets

(51) Int. Cl.
*H04W 76/10* (2018.01)
*H04W 84/18* (2009.01)

(58) Field of Classification Search
USPC .......................................................... 455/41.2
See application file for complete search history.

(56) References Cited

U.S. PATENT DOCUMENTS

| | | | | |
|---|---|---|---|---|
| 2020/0228953 | A1* | 7/2020 | Thoukydides | H04W 4/80 |
| 2020/0314735 | A1* | 10/2020 | Aijaz | H04W 52/46 |
| 2021/0135692 | A1* | 5/2021 | de Ruijter | H04L 27/0008 |
| 2021/0242894 | A1* | 8/2021 | de Ruijter | H04B 1/1638 |

OTHER PUBLICATIONS

Temboo, "Everything You Need to Know About Bluetooth Mesh for Industrial IoT", Feb. 24, 2018.

Hadi Deknache; Mikael Nilsson, "Investigation of Bluetooth Mesh and Long Range for IoT wearables", Date of final seminar May 30, 2018, Malmo University.

Article "It's practical to implement BLE mesh network through connection/broadcast method" from Communication Components Magazine, Dec. 1, 2021.

* cited by examiner

BLUETOOTH MESH NETWORK SYSTEM AND CONNECTION METHOD HAVING COMMUNICATION RANGE EXTENDING MECHANISM

BACKGROUND OF THE INVENTION

1. Field of the Invention

The present invention relates to a Bluetooth mesh network system and a Bluetooth mesh network connection method having communication range extending mechanism.

2. Description of Related Art

Along with the quick development of Internet of Things (IoT) technology in recent years, the applications of smart home, smart building and smart factory increase in a great deal. The technology of Bluetooth, which is a lower power dissipation technology, becomes more and more important. The standard organization of Bluetooth, i.e. Bluetooth Special Interest Group (Bluetooth SIG), intends to implement many-to-many communication by introducing Bluetooth mesh network technology, to provide communications with longer transmission distance. Such technology is considered to expand the IoT market.

In a Bluetooth mesh network, the nodes are able to perform communication within a reasonable range. However, when the nodes are distanced from each other for a longer physical distance, relay nodes are required to be disposed to allow the nodes perform communication through the relay nodes. Such a method increases the cost of network establishment.

SUMMARY OF THE INVENTION

In consideration of the problem of the prior art, an object of the present invention is to supply a Bluetooth mesh network system and a Bluetooth mesh network connection method having communication range extending mechanism.

The present invention discloses a Bluetooth mesh network system having a communication range extending mechanism that includes a plurality of nodes and a provisional node. The provisional node is configured to transmit a connection setting packet to the nodes to control the nodes to establish a coded PHY connection between each two of the nodes, such that a packet error rate is kept to be not larger than a threshold value when the nodes perform communication under a condition that a physical distance between each two of the nodes is larger than a maximum non-coded-PHY communication distance, in which when the nodes establish a non-coded-PHY connection and the physical distance is larger than the maximum non-coded-PHY communication distance, the packet error rate is larger than the threshold value.

The present invention also discloses a Bluetooth mesh network system connection method having communication range extending mechanism that includes the steps outlined below. A connection setting packet is transmitted by a provisional node to a plurality of nodes to control the nodes to establish a coded PHY connection between each two of the nodes. Communication is performed by the nodes with a packet error rate kept to be not larger than a threshold value under a condition that a physical distance between each two of the nodes is larger than a maximum non-coded-PHY communication distance, in which when the nodes establish a non-coded-PHY connection and the physical distance is larger than the maximum non-coded-PHY communication distance, the packet error rate is larger than the threshold value.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a Bluetooth mesh network system and a Bluetooth mesh network connection method having communication range extending mechanism to extend the communication range of the node without disposing relay nodes.

Figure 1:
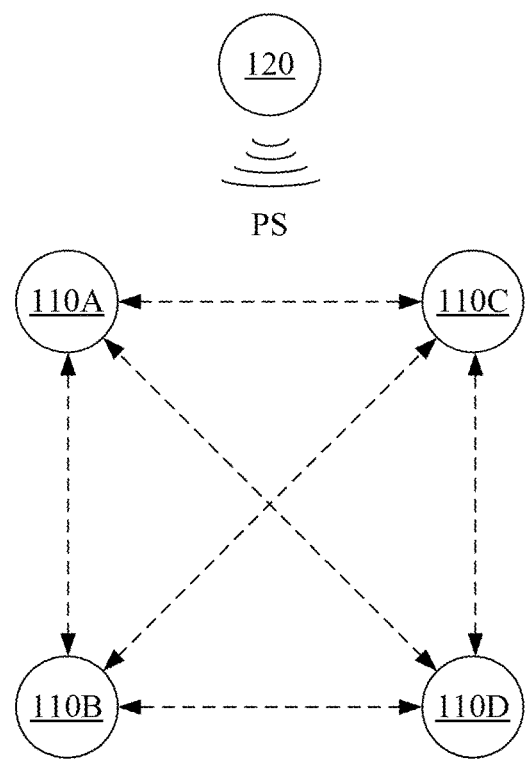
FIG. 1 illustrates a diagram of a Bluetooth mesh network system having communication range extending mechanism according to an embodiment of the present invention.

Reference is made to FIG. 1. FIG. 1 illustrates a diagram of a Bluetooth mesh network system 100 having communication range extending mechanism according to an embodiment of the present invention. The Bluetooth mesh network system 100 includes a plurality of nodes 110A~410D and a provisional node 120.

The nodes 110A~410D and the provisional node 120 are capable of performing communication with each other under the protocol of Bluetooth mesh network. The provisional node 120 is configured to control the nodes 110A~110D to connect to each other with different connection methods under the condition that the connection methods fit the protocol of the Bluetooth mesh network.

In the present embodiment, the provisional node 120 is configured to transmit a connection setting packet PS to the nodes 110A~410D, by using such as but not limited to broadcasting, to control the nodes 110A~110D to establish a coded PHY connection (illustrated as dashed lines in FIG. 1) between each two of the nodes 110A~110D, such that a packet error rate is kept to be not larger than a threshold value when the nodes 110A~410D perform communication under a condition that a physical distance between each two of the nodes 110A~110D is larger than a maximum non-coded-PHY communication distance.

In a usage scenario, the provisional node 120 controls the nodes 110A~110D to establish a non-coded-PHY connection first in a default situation, e.g., a LE 1M PHY connection or a LE 2M PHY connection in Bluetooth Low Energy (BLE) standard.

However, when the physical distance between any two of the nodes 110A~410D increases, the communication quality drops. In an embodiment, when the nodes 110A~110D establish a non-coded-PHY connection and the physical distance is larger than the maximum non-coded-PHY communication distance, the packet error rate is larger than a threshold value.

As a result, the provisional node 120 controls the nodes 110A~410D to establish a coded PHY connection. In an embodiment, the coded PHY connection can be based on a 2-bit coding scheme or an 8-bit coding scheme. The 2-bit coding scheme is termed S=2 and the 8-bit coding scheme is termed S=8, in which S is the number of symbols for each bit. In an embodiment, besides the cyclic redundancy check (CRC), the coding method may include convolutional coding and mapping to lower the packet error rate by increasing the redundancy. As a result, a better communication quality can be kept when the physical distance among the nodes 110A~110D increases.

As a result, since the communication distance between each of the two nodes is allowed to be longer, the communication range covered by the Bluetooth mesh network system 100 becomes larger. In an embodiment, the communication distance between each of the two nodes of the communication performed based on the coded PHY connection can be four times of the communication distance between each of the two nodes of the communication performed based on the non-coded-PHY connection.

In an embodiment, the provisional node 120 receives a control signal from such as, but not limited to an operation interface (not illustrated in the figure) operated by a user when the nodes 110A~410D establish the non-coded-PHY connection in the default situation, so as to generate the connection setting packet PS to control the nodes 110A~410D to establish the coded PHY connection between each two of the nodes 110A~410D.

In another embodiment, the provisional node 120 determines the packet error rate of the nodes 110A~410D when the nodes 110A~110D establish the non-coded-PHY connection in the default situation. The provisional node 120 determines that the physical distance between each two of the nodes 110A~110D is larger than the maximum non-coded-PHY communication distance when the packet error rate is larger than the threshold value. As a result, the provisional node 120 generates the connection setting packet PS to control the nodes 110A~110D to establish the coded PHY connection between each two of the nodes 110A~410D when the packet error rate is larger than the threshold value.

It is appreciated that the provisional node 120 may use other methods to determine whether the physical distance between each two of the nodes 110A~110D is larger than the maximum non-coded-PHY communication distance, to further control the nodes 110A~410D to establish the coded PHY connection such that the degradation in the communication quality due to the physical distance can be avoided. The present invention is not limited thereto.

In an embodiment, the provisional node 120 controls the nodes 110A~410D in FIG. 1 to establish a many-to-many communication based on a broadcast protocol. More specifically, the nodes 110A~110D establish the many-to-many communication through the advertising bearer based on the broadcast protocol to form a local area network.

Figure 2:
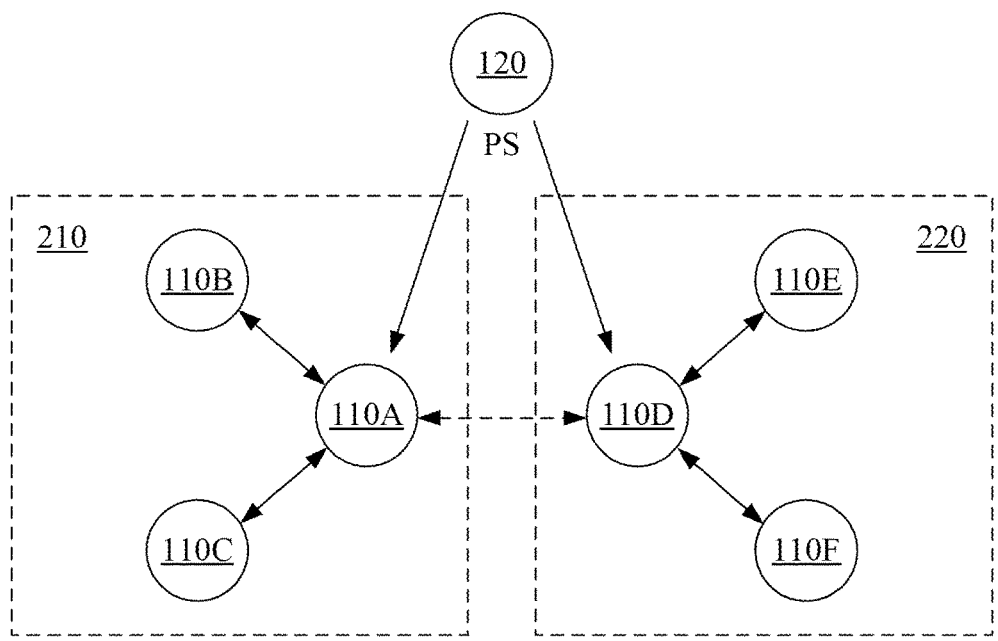
FIG. 2 illustrates a diagram of a Bluetooth mesh network system having communication range extending mechanism according to another embodiment of the present invention.

Reference is now made to FIG. 2. FIG. 2 illustrates a diagram of a Bluetooth mesh network system 200 having communication range extending mechanism according to another embodiment of the present invention. Similar to the Bluetooth mesh network system 100 in FIG. 1, the Bluetooth mesh network system 200 includes the nodes 110A~410F and the provisional node 120.

In the present embodiment, the nodes 110A~110C form a first local area network 210 and the nodes 110D~110F form a second local area network 220. Between the first local area network 210 and the second local area network 220, the node 110A and the node 110D are the nodes having the smallest physical distance.

The provisional node 120 is configured to transmit a connection setting packet PS to the node 110A and the node 110D, by using such as but not limited to a one-to-one transmission method, to control the node 110A and the node 110D to establish a coded PHY connection (illustrated as a dashed line in FIG. 2) therebetween, such that a packet error rate is kept to be not larger than a threshold value when the node 110A and the node 110D perform communication under a condition that a physical distance between the node 110A and the node 110D is larger than a maximum non-coded-PHY communication distance.

Further, the first local area network 210 and the second local area network 220 can be connected through the node 110A and the node 110D. More specifically, any node in the first local area network 210 can perform communication with any node in the second local area network 220 through the node 110A and the node 110D. In an embodiment, the node 110A and the node 110D may activate a relay mode to transmit packets between the first local area network 210 and the second local area network 220.

It is appreciated that when the physical distance is within a tolerable range, the nodes 110A~410C in the first local area network 210 can still establish the non-coded-PHY connection (illustrated as solid lines in FIG. 2) between each two of the nodes 110A~110C. Similarly, when the physical distance is within a tolerable range, the nodes 110D~110F in the second local area network 220 can still establish the non-coded-PHY connection (illustrated as solid lines in FIG. 2) between each two of the nodes 110D~110F. The present invention is not limited thereto.

In an embodiment, the provisional node 120 controls the node 110A and the node 110D in FIG. 2 to establish a one-to-one communication based on a connection protocol. More specifically, the node 110A and the node 110D can establish the one-to-one communication through a generic attribute protocol bearer (GATT bearer) based on the connection protocol. The connection protocol is such as, but not limited to the proxy.

It is appreciated that the number of nodes in the embodiment described above is merely an example. In other embodiments, the number of nodes can be different depending on practical requirements. The present invention is not limited thereto.

Figure 3:
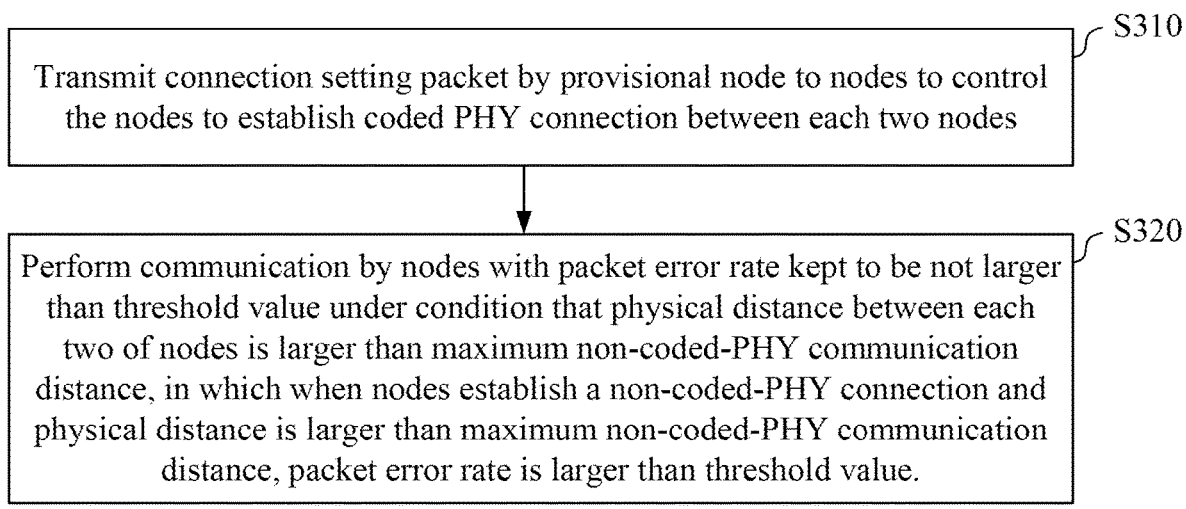
FIG. 3 illustrates a flow chart of a Bluetooth mesh network system connection method having communication range extending mechanism according to an embodiment of the present invention.

Reference is now made to FIG. 3. FIG. 3 illustrates a flow chart of a Bluetooth mesh network system connection method 300 having communication range extending mechanism according to an embodiment of the present invention.

In addition to the apparatus described above, the present disclosure further provides the Bluetooth mesh network system connection method 300 that can be used in such as, but not limited to, the Bluetooth mesh network system 100 in FIG. 1 or the Bluetooth mesh network system 200 in FIG. 2. The following description is made by using the Bluetooth mesh network system 100 in FIG. 1 as an example. As illustrated in FIG. 3, an embodiment of the Bluetooth mesh network system connection method 300 includes the following steps.

In step S310, the connection setting packet PS is transmitted by the provisional node 120 to the nodes 110A~410D to control the nodes 110A~410D to establish the coded PHY connection between each two of the nodes 110A~410D.

In step S320, communication is performed by the nodes 110A~410D with the packet error rate kept to be not larger than the threshold value under the condition that the physical distance between each two of the nodes 110A~110D is larger than the maximum non-coded-PHY communication distance, in which when the nodes 110A~410D establish a non-coded-PHY connection and the physical distance is larger than the maximum non-coded-PHY communication distance, the packet error rate is larger than the threshold value.

It is appreciated that the embodiments described above are merely an example. In other embodiments, it should be appreciated that many modifications and changes may be made by those of ordinary skill in the art without departing, from the spirit of the disclosure.

In summary, the Bluetooth mesh network system and the Bluetooth mesh network connection method having communication range extending mechanism of the present invention extends the communication range of the node without disposing relay nodes.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A Bluetooth mesh network system having a communication range extending mechanism, comprising:
    a plurality of nodes; and
    a provisional node configured to transmit a connection setting packet to the nodes to control the nodes to establish a coded PHY connection between each two of the nodes, such that a packet error rate is kept to be not larger than a threshold value when the nodes perform communication under a condition that a physical distance between each two of the nodes is larger than a maximum non-coded-PHY communication distance, in which when the nodes establish a non-coded-PHY connection and the physical distance is larger than the maximum non-coded-PHY communication distance, the packet error rate is larger than the threshold value.

2. The Bluetooth mesh network system of claim 1, wherein the provisional node controls the nodes to establish a many-to-many communication based on a broadcast protocol.

3. The Bluetooth mesh network system of claim 1, the provisional node controls the nodes to establish a one-to-one communication based on a connection protocol.

4. The Bluetooth mesh network system of claim 3, wherein the nodes at least comprise a first node and a second node, in which the first node is in a first local area network and the second node is in a second local area network, and at least one node comprised in the first local area network and at least one node comprised in the second local area network are connected through the first node and the second node.

5. The Bluetooth mesh network system of claim 1, wherein the provisional node is further configured to receive a control signal when the nodes establish the non-coded-PHY connection, so as to control the nodes to establish the coded PHY connection between each two of the nodes.

6. The Bluetooth mesh network system of claim 1, wherein the provisional node is further configured to determine the packet error rate of the nodes when the nodes establish the non-coded-PHY connection, so as to control the nodes to establish the coded PHY connection between each two of the nodes when the packet error rate is larger than the threshold value.

7. A Bluetooth mesh network system connection method having communication range extending mechanism, comprising:
    transmitting a connection setting packet by a provisional node to a plurality of nodes to control the nodes to establish a coded PHY connection between each two of the nodes; and
    performing communication by the nodes with a packet error rate kept to be not larger than a threshold value under a condition that a physical distance between each two of the nodes is larger than a maximum non-coded-PHY communication distance, in which when the nodes establish a non-coded-PHY connection and the physical distance is larger than the maximum non-coded-PHY communication distance, the packet error rate is larger than the threshold value.

8. The Bluetooth mesh network system connection method of claim 7, further comprising:
    controlling the nodes to establish a many-to-many communication based on a broadcast protocol by the provisional node.

9. The Bluetooth mesh network system connection method of claim 7, further comprising:
    controlling the nodes to establish a one-to-one communication based on a connection protocol by the provisional node.

10. The Bluetooth mesh network system connection method of claim 9, wherein the nodes at least comprise a first node and a second node, in which the first node is in a first local area network and the second node is in a second local area network, and the at least one node respectively comprised in the first local area network and the second local area network are connected through the first node and the second node.

11. The Bluetooth mesh network system connection method of claim 7, further comprising:
    receiving a control signal by the provisional node when the nodes establish the non-coded-PHY connection, so as to control the nodes to establish the coded PHY connection between each two of the nodes.

12. The Bluetooth mesh network system connection method of claim 7, further comprising:
    determining the packet error rate of the nodes by the provisional node when the nodes establish the non-coded-PHY connection, so as to control the nodes to establish the coded PHY connection between each two of the nodes when the packet error rate is larger than the threshold value.

* * * * *